(12) United States Patent
Johnson et al.

(10) Patent No.: US 7,945,598 B2
(45) Date of Patent: May 17, 2011

(54) METHODOLOGY FOR THE AUTOMATIC CAPTURE OF PROCESS INFORMATION IN FEDERATED KNOWLEDGE SYSTEMS

(75) Inventors: Sandra K. Johnson, Cary, NC (US); Joan LaVerne Mitchell, Longmont, CO (US); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/259,680

(22) Filed: Oct. 28, 2008

(65) Prior Publication Data

US 2010/0114978 A1    May 6, 2010

(51) Int. Cl.
 G06F 17/30    (2006.01)
 G06F 7/00    (2006.01)
(52) U.S. Cl. .................................. 707/803; 707/791
(58) Field of Classification Search ........... 707/999.102, 707/791, 803, E17.014, E17.044
 See application file for complete search history.

(56) References Cited

U.S. PATENT DOCUMENTS

| | | | |
|---|---|---|---|
| 6,314,420 B1 | 11/2001 | Lang et al. | |
| 6,847,974 B2* | 1/2005 | Wachtel | 717/143 |
| 6,915,294 B1 | 7/2005 | Singh et al. | |
| 7,039,864 B1 | 5/2006 | Piersol et al. | |
| 7,051,036 B2 | 5/2006 | Rosnow et al. | |
| 7,065,536 B2 | 6/2006 | Bachman et al. | |
| 7,216,121 B2 | 5/2007 | Bachman et al. | |
| 7,395,277 B2 | 7/2008 | Miller et al. | |
| 7,533,305 B2* | 5/2009 | Behdjati et al. | 714/57 |
| 2003/0058277 A1* | 3/2003 | Bowman-Amuah | 345/765 |
| 2004/0103181 A1 | 5/2004 | Chambliss et al. | |
| 2005/0278362 A1* | 12/2005 | Maren et al. | 707/100 |
| 2006/0015479 A1* | 1/2006 | Wood et al. | 707/2 |
| 2006/0074891 A1 | 4/2006 | Chandrasekar et al. | |
| 2006/0122812 A1 | 6/2006 | Tinseth | |
| 2006/0167890 A1 | 7/2006 | Miller et al. | |
| 2007/0112781 A1 | 5/2007 | McMullen et al. | |
| 2008/0275858 A1* | 11/2008 | Day et al. | 707/3 |
| 2009/0248688 A1* | 10/2009 | Kim et al. | 707/7 |
| 2009/0293060 A1* | 11/2009 | Guevorkian et al. | 718/102 |
| 2010/0017427 A1* | 1/2010 | Johnson et al. | 707/102 |

OTHER PUBLICATIONS

Pautasso, Cesare, et al., "The JOpera visual composition language", Journal of Visual Languages and Computing, vol. 16, Issues 1-2, Feb.-Apr. 2005, pp. 119-152.*
Fileto, Renato, et al., "POESIA: An ontological workflow approach for composing Web services in agriculture", The VLDB Journal, vol. 12, Issue 4, Nov. 2003, pp. 352-367.*

(Continued)

*Primary Examiner* — Robert Stevens
(74) *Attorney, Agent, or Firm* — Yee & Associates, P.C.; Steven L. Bennett (57) ABSTRACT

A mechanism for automatically managing process information stored in federated repositories. When practice requirements are collected for a multi-step process, a process metadata data structure comprising process information conforming to the practice requirements is created in a metadata repository. The structure is created by creating a template document for each task in the multi-step process and populating the template documents with the procedure information in the practice requirements. Hierarchical and horizontal associations are created among the template documents based on the execution order of the tasks in the procedure information. Process documents for each task in the multi-step process are created and populated with information about the tasks. The task information, procedure information, and association information for each task is then stored as metadata in the process metadata structure.

20 Claims, 5 Drawing Sheets

OTHER PUBLICATIONS

Pautasso, Cesare, et al., "JOpera: A Toolkit for Efficient Visual Composition of Web Services", International Journal of Electronic Commerce, vol. 9, No. 2, Winter 2004/2005, pp. 107-141.*

Ceglar, Aaron, et al., "Visualising hierarchical associations", Knowledge and Information Systems, vol. 8, Springer-Verlag, London, UK, Sep. 30, 2004, pp. 257-275.*

USPTO office action for U.S. Appl. No. 12/173,668 dated Nov. 12, 2010, 14 pages.

USPTO office action for U.S. Appl. No. 12/173,689 dated Nov. 22, 2010, 15 pages.

U.S. Appl. No. 12/173,668, filed Jul. 15, 2008, Johnson et al.

U.S. Appl. No. 12/173,689, filed Jul. 15, 2008, Johnson et al.

Howarth et al., "Visualizing Search Results from Metadata-enabled Repositories in Cultural Domains", Charting the Topic Maps Research and Applications Landscape, 1st International Workshop, Leipzig, Oct. 6-7, 2005, TMRA 2005 Revised Selected Papers (published 2006) pp. 263-270.

Aridor et al., "Knowledge Encapsulation for Focused Search from Pervasive Devices", ACM, WWW10 May 1-5, 2001, Hong Kong, pp. 754-763.

Berger et al., "An Adaptive Information Retrieval System based on Associative Networks", 2004 Australian Computer Society Inc., Proceedings of First Asia-Pacific Conference on Conceptual Modelling, Dunedin, New Zealand.pp. 1-10.

Pasca, "Acquisition of Categorized named Entities for Web Search", CIKM'04, Nov. 2004, Washington DC, ACM 2004, pp. 137-145.

Stojanovic, "On the Role of a User's Knowledge Gap in an Information Retrieval Process", K-CAP'05, Oct. 2005, Banff, Alberta, Canada, ACM 2005, pp. 83-90.

Moody, "The STARS Process Engine: Language and Architecture to Support Process Capture and Multi-User Execution", Baltimore, MD, 1994, pp. 4-15.

Rus et al., "Customizing Information Capture and Access", ACM Transactions on Information Systems, vol. 15, No. 1, Jan. 1997, pp. 67-101.

* cited by examiner

FIG. 6 ary of the Invention

METHODOLOGY FOR THE AUTOMATIC CAPTURE OF PROCESS INFORMATION IN FEDERATED KNOWLEDGE SYSTEMS

CROSS REFERENCE TO RELATED APPLICATIONS

The present invention is related to the following applications entitled "MULTILEVEL HIERARCHICAL ASSOCIATIONS BETWEEN ENTITIES IN A KNOWLEDGE SYSTEM", Ser. No. 12/173,689, filed on Jul. 15, 2008; and "LEVERAGING MULTILEVEL HIERARCHICAL ASSOCIATIONS TO FIND CROSS-BOUNDARY ISSUES", Ser. No. 12/173,668, filed on Jul. 15, 2008. The related applications are assigned to the same assignee and are incorporated herein by reference.

BACKGROUND OF THE INVENTION

1. Field of the Invention

Embodiments of the present invention relate generally to an improved data processing system, and in particular to a computer implemented method, data processing system, and computer program product for automatically capturing process information in federated knowledge systems.

2. Description of the Related Art

In knowledge-based environments, the availability and leveraging of information, coupled with associated human expertise, is a critical component for improved process, implementation, and utilization efficiencies. A knowledge base provides a plethora of information about a specific subject matter in multiple data sources that can be accessed from global locations with Internet access, or other relevant technologies. Given this vast knowledge base, however, finding and accessing specific or associated information about a given subject matter may be prohibitively challenging. In addition, accessing, leveraging, and analyzing information in these disparate repositories in a collaborative manner can illuminate root causes of issues that otherwise may not be apparent.

Targeted information in a knowledge base may be associated with horizontal or multilevel hierarchical structures. For example, targeted information comprising an information technology (IT) solution may consist of several components, including products, service components, solution building blocks (SBBs), or other entities. In this example, the solution information can be viewed as a hierarchical knowledge-based structure. The information includes specifics about the solution, such as a list of products, services, and SBBs that compose the solution, including specific versions and fix pack information, integration test scripts, etc. In addition, separate information exists for each component of the solution, such as product test scripts, product owner, life cycle, etc. As a result, there are many potential linkages among the different components to create the IT solution with its associated knowledge base. This multilevel hierarchical structure introduces additional levels of complexity, relative to linear or horizontal knowledge-based systems. In fact, this multilevel hierarchical structure can be layered on top of a linear or horizontal structure to more efficiently address these additional levels of complexity.

BRIEF SUMMARY OF THE INVENTION

The illustrative embodiments provide a computer implemented method, data processing system, and computer program product for automatically capturing process information in federated knowledge systems. In today's computing environment, complex network data processing systems often are needed to facilitate work in large corporations. These complex networks may even span across regions in various worldwide locations, as well as use the Internet as part of a virtual private network for conducting business. In many instances, a federated knowledge-based system is employed to allow enterprise components to share and access information throughout the network. With the federated knowledge-based system, wherein multiple data sources appear as one to users, data resides and is controlled locally, and client users in the system, regardless of location, may access the data across multiple disparate repositories using a directory service.

There are many instances where it is necessary to understand and traverse the multilevel hierarchy of a federated knowledge-based system. For example, using the IT solution scenario described previously, if a problem arises with a deployed IT solution, there may be a situation where a software bug is found in a product. In addition to the product being a stand-alone software product, the product may be present as a component in many different solutions. As a result, there is a need to find all of the solutions that contain this specific version of the product that is deployed in IT environments worldwide, potentially applying the fix automatically. Furthermore, areas with broad functions and capabilities, such as security, are present in many different product offerings. Therefore, the support structure associated with these areas is vast and may be too complex to render in a two-level hierarchy. A multilevel structure is more appropriate. Another example of similar complexity is the multiple versions of product offerings that could potentially compose a solution. The support structure associated with the various permutations of the product releases, all of which could result in different solution instantiations, may also be rendered in a multilevel knowledge-based infrastructure. This facilitates a more flexible mechanism for representing more complex relationships and associations, relative to the horizontal approach.

The illustrative embodiments provide a mechanism for automatically capturing and accessing process information that may be stored in federated repositories worldwide. The illustrative embodiment first collect practice requirements for a multi-step process. The practice requirements comprise procedure information for performing tasks in the multi-step process, and the procedure information specifies a particular execution order of the tasks in the multi-step process. A process metadata data structure comprising process information that conforms to the practice requirements is created in a metadata repository. The process metadata data structure is created by creating a template document for each task in the multi-step process and populating the template documents with the procedure information in the practice requirements. Hierarchical and horizontal associations are created among the template documents based on the execution order of the tasks in the procedure information. Process documents for each task in the multi-step process are created and populated with information about the tasks. The task information, procedure information, and association information for each task is stored as metadata in the process metadata structure.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the program stored on the computer-usable or computer-readable medium could be electronically captured, via, for instance, optical scanning of the paper or other medium, then compiled, interpreted, or otherwise processed in a suitable manner, and then implemented on a computer program product stored in a tangible computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
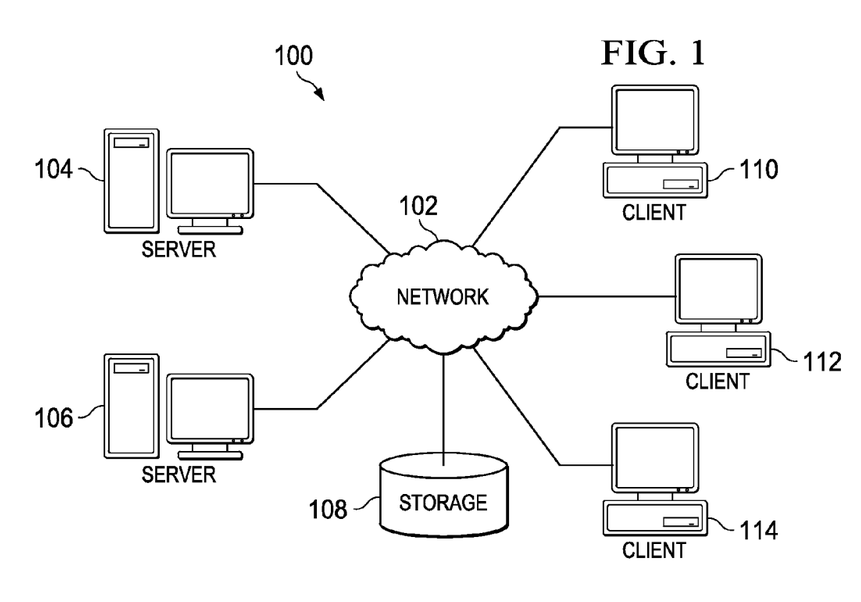
FIG. 1 depicts a pictorial representation of a distributed data processing system in which the illustrative embodiments may be implemented.
Figure 2:
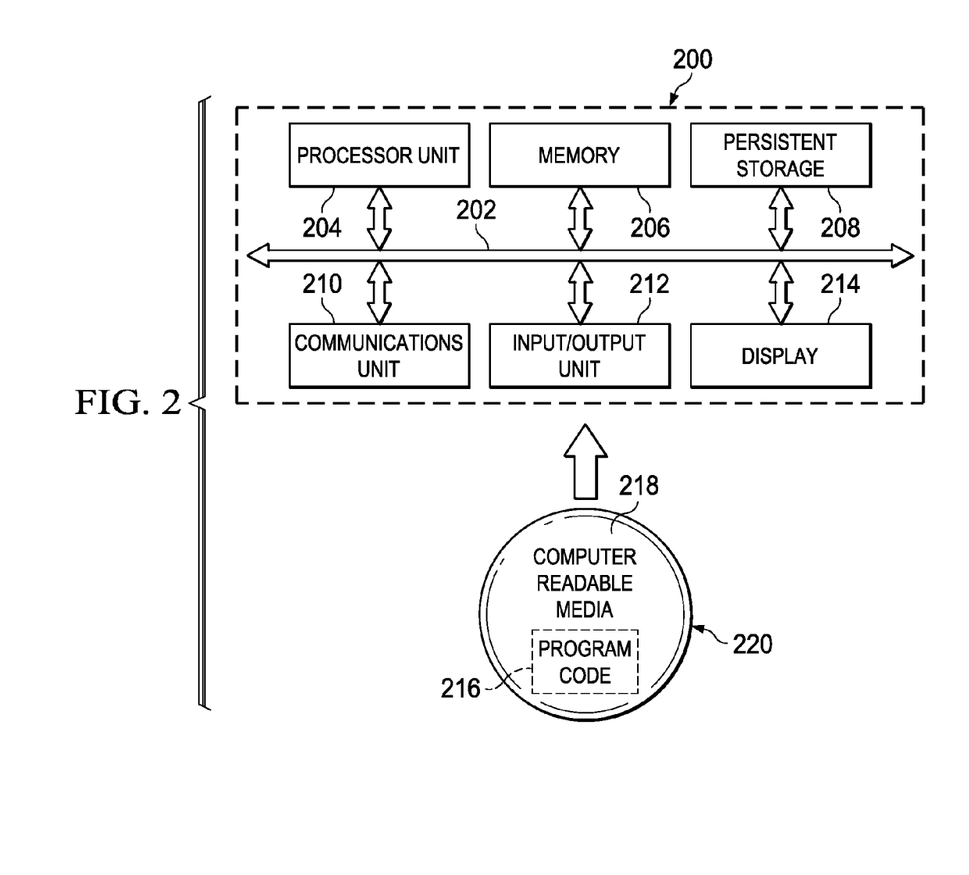
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments facilitate sharing of knowledge-based information present in a federated knowledge system, where the knowledge-based information is stored in multiple, disparate data sources. A multilevel knowledge enablement framework is used to implement the illustrative embodiments for leveraging information (or entities) available in multiple, disparate repositories and enhancing the information through virtual layers of metadata on top of the existing repositories (knowledge stores).

The illustrative embodiments provide a methodology for capturing and accessing information about multi-step processes that may span boundaries in a federated knowledge system. The process information is stored as metadata in the multilevel knowledge enablement framework, wherein the metadata comprises data about a task and pointers/links to other related tasks. This task information, or 'process metadata', may include information about the ownership of a task, access and modification timestamps of the task, dependencies on other tasks, etc. The process metadata is stored within the metadata space in a metadata repository.

To facilitate information sharing across disparate repositories, the illustrative embodiments capture and provide access to process-related information (e.g., documents, schedules, etc.) both horizontally and vertically. Process-related information may be shared horizontally among entities at a same level in a knowledge system, or shared vertically (hierarchical relationships) in multiple levels in the knowledge system. In one example, the captured information may comprise the actual tasks performed during a process life cycle (e.g. development, test, product, etc.). This process information is then stored as process metadata within the repository space. Both horizontal metadata associations and multilevel metadata associations are used in such a way that process information may be appended to the metadata associations to provide valuable feedback about process conformity and missteps, necessary corrective process actions, and process bottlenecks. The knowledge systems may be searched periodically for this process-related information and provide instant feedback to the user, thereby allowing for the early detection of problems with a process and enabling corrective actions (refinements) to be put in place immediately, or to check for adherence to the given process requirements by team members.

The illustrative embodiments provide a mechanism for capturing information about actual tasks in a multi-step process in accordance with practice requirements. Practice requirements specify a set of procedures and their defined order of execution that cover all key tasks in a multi-step process in an organization. ISO9000 is a family of standards for quality management systems and comprises one example of practice requirements which may be employed by the illustrative embodiments. ISO9000 is maintained by the International Organization for Standardization and provides a number of requirements which an organization should fulfill if the organization is to achieve customer satisfaction through consistent products and services which meet customer expectations. The illustrative embodiments allow process information metadata to be used to provide valuable feedback about conformity with practice requirements (e.g., ISO9000), necessary corrective process actions (e.g., which process tasks are irrelevant), and process bottlenecks (e.g., which tasks take too long to complete).

To capture information about tasks in a multi-step process, the mechanism of the illustrative embodiments first obtains the practice requirements that define mandatory procedures that should be followed when performing key tasks in the multi-step process. The mechanism of the illustrative embodiments then creates a process metadata data structure from the collected practice requirements. To create the process metadata data structure, template or skeleton documents are created for each task of a multi-step process and are populated with the mandatory procedure information for the specific tasks. A template document comprises one or more required procedures that must be followed in performing a task in order to be in compliance with the practice requirements. In other words, the template document represents the procedures that are required by the practice requirements. Input provided by a user may be used to specify the hierarchy of each template document in relation to one another (i.e., the order of task execution) as defined by the practice requirements.

Once the template documents have been created for each task in the multi-step process, the mechanism of the illustrative embodiments creates the actual process documents in the execution order as defined by the practice requirements and populates these process documents with task information. Each process document comprises information about a particular task, such as the name, description, owner, time stamp, etc. of the task in the multi-step process. When a process document is created, pointers to the process documents in the process metadata data structure are then updated and captured to reflect the task execution order dictated by the practice requirements flow. Thus, the mechanism of the illustrative embodiments captures, in accordance with defined practice requirements, information about tasks performed in a multi-step process, including the procedures and the order in which the tasks are to be performed. With the illustrative embodiments, a knowledge system may be searched periodically for process-related information using the process metadata data structure and may provide instant feedback to the user. The mechanism of the illustrative embodiments may also be employed to check for adherence to the given practice requirements and enable the retrieval of process information during an audit to show compliance.

Figure 3:
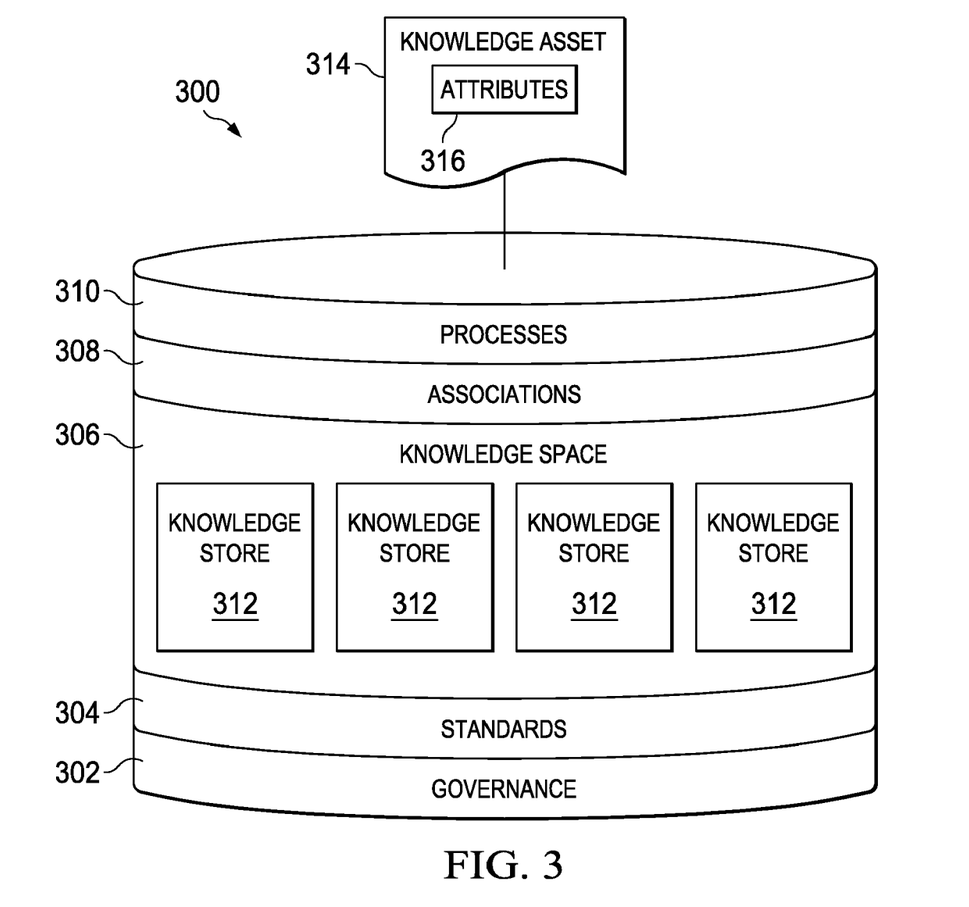
FIG. 3 is a high level graphical illustration of the knowledge enablement framework in accordance with the illustrative embodiments.

FIG. 3 is a high level graphical illustration of the knowledge enablement framework in accordance with the illustrative embodiments. Knowledge enablement framework 300 allows for storing and linking multilevel hierarchical information that may be present in federated repositories worldwide. Knowledge enablement framework 300 includes metadata comprising association links and process data, for information that may be in multiple levels in the hierarchy. In addition, knowledge enablement framework 300 includes provisions to enable entity notifications, based upon a top down or bottom up approach, to find all instantiations of the objects of the hierarchical information.

In this illustrative example, knowledge enablement framework 300 comprises various layers, including governance layer 302, standards layer 304, knowledge space 306, associations layer 308, and processes layer 310. Governance layer 302 is a virtual layer in the framework that represents rules for determining who is allowed access to a repository, as well as how the repository may be accessed. Standards layer 304 is a virtual layer that represents the standards (i.e., common pieces of information) required to access information across the repositories in the framework. Knowledge space 306 represents the multiple repositories in the framework, which may be viewed as one virtual repository. Each cylinder in knowledge space 306 represents an individual repository in the framework. Each individual knowledge store 312 may have its own governance and standards controls. Knowledge asset 314 is an entity or entry in a knowledge store 312, and attributes 316 comprise a description of the entry (e.g., type, size, etc.)

Associations layer 308 is a virtual layer of metadata on top of knowledge space 306 layer. Associations layer 308 represents associations between entities in the repositories in knowledge space 306 which are stored as metadata in knowledge space 306. Using the example of an IT solution, associations layer 308 may comprise relevant information regarding multilevel hierarchical entities (e.g., IT solutions), including linkages to entities composing the entities (e.g., products) as well as to other solutions and entities. Associations layer 308 may further include provisions to enable the discovery and notification of entities included in the hierarchy (all instantiations of this solution in the install base) based upon the federated knowledge base of information and linkages associated with these hierarchies. These provisions may be used in a situation where a bug is found in one of the components, and there is a need to automatically find, notify and potentially upgrade all of the relevant components in the solution that is deployed in environments worldwide.

Processes layer 310 is a virtual layer on top of associations layer 308 which may be used to facilitate the sharing of information, across boundaries, such as among disparate repositories. Processes layer 310 may be used to examine the association links in associations layer 308 in order to determine the processes and tasks that may span repositories. After the processes layer 310 identifies related processes and tasks using the association metadata in the associations layer 308, processes layer 310 then determines further information about the processes, or 'process metadata'. This 'process metadata' may include information about the owner of the processes, the time the processes were accessed or changed, the process hierarchy, etc.

Once the process metadata about processes and tasks that span repositories is determined, this information is stored within knowledge space 306. For example, if the entity is a phase in a software test process, processes layer 310 may examine the association links of the entity/component to determine all of the steps/phases associated with the software test process, and then determine the process metadata about the phases. Thus, processes layer 310 provides an information sharing methodology by which metadata comprising associated linkages in the associations layer 308 form the basis for the sharing of information located in disparate data sources.

Figure 4:
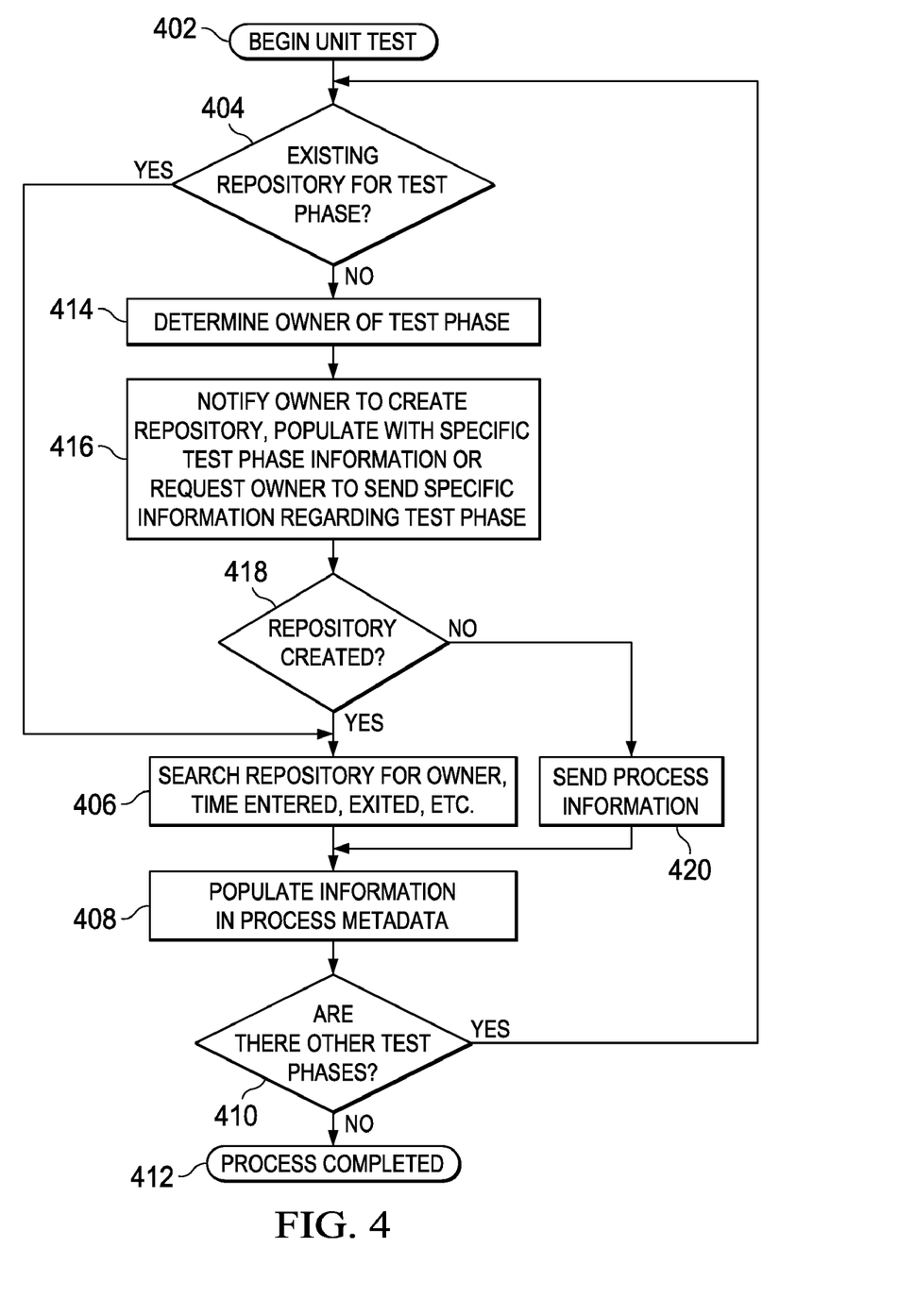
FIG. 4 is a flowchart of an exemplary process in the multilevel knowledge enablement framework for populating processing information in the metadata in a federated knowledge repository system in accordance with the illustrative embodiments.

FIG. 4 is a flowchart of a process in the multilevel knowledge enablement framework for populating processing information in the metadata in a federated knowledge repository system in accordance with the illustrative embodiments. The process described in FIG. 4 may be implemented within knowledge enablement framework 300 in FIG. 3.

The process begins when a task, such as a unit test in one phase of a software test process or testflow, is initiated (step 402). A determination is made as to whether there is an existing repository which already comprises identity information about the task (step 404). If there is an existing repository which already comprises identity information about the task ('yes' output of step 404), the repository is searched to determine the process information about the task (step 406). The process information may include information about the owner of the task, the time the task was entered, the time the task was exited, etc. Once the process information for the task has been obtained, the process information is populated in the repository as process metadata (step 408). A determination is then made as to whether there are any other tasks in the testflow (step 410). In one embodiment, this determination may be made based on the current task. For instance, if the testflow is a sequential process, and the current phase is not the last phase in the testflow, then there must be other tasks in the testflow to process. In another embodiment, an indicator (e.g., in the repository structure) may be used to indicate that the current task is not the last task in the testflow. If there are no other tasks to process ('no' output of step 410), the process is completed (step 412) and terminates thereafter. If there are other tasks in the testflow to process ('yes' output of step 410), the process returns to step 404 to determine if there is an existing repository for the next task in the testflow.

Turning back to step 404, if there is not an existing repository which already comprises process information about the task ('no' output of step 404), the process determines the owner of the task (step 414). The owner may be found in a private repository, in another repository not currently accessible, or in a private conversation. The process then notifies the owner of the task to create a repository for the task and populate the repository with process information about the task or requests that the owner provide the process information about the task (step 416). A determination is made as to whether a repository has been created and populated by the owner (step 418). If a repository has been created and populated by the owner ('yes' output of step 418), the process continues to step 406 to search the repository to determine the process information about the task. However, if a repository has not been created by the owner ('no' output of step 418), the owner sends the process information (step 420). The process then continues to step 408 in which the process information sent from the owner is populated in the repository in the process metadata.

Figure 5:
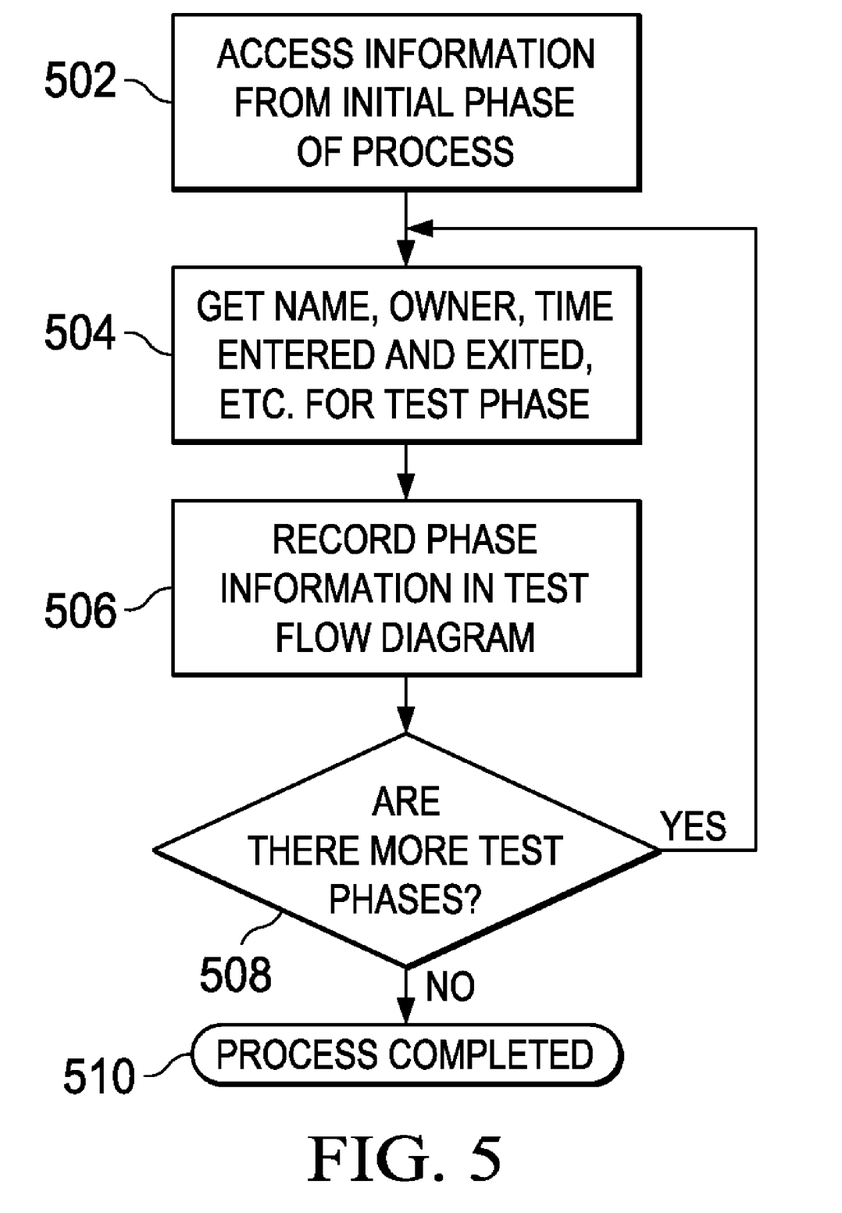
FIG. 5 is a flowchart of an exemplary process in the multilevel knowledge enablement framework for accessing process information from the metadata in a federated knowledge repository system in accordance with the illustrative embodiments.

FIG. 5 is a flowchart of a process in the multilevel knowledge enablement framework for accessing process information from the metadata in a federated knowledge repository system in accordance with the illustrative embodiments. The process described in FIG. 5 may be implemented within knowledge enablement framework 300 in FIG. 3.

The process begins by accessing process information from a first task of the testflow (step 502). This process information was previously populated in the repository as described by the process in FIG. 4. The process then collects the process information about the task, including the task name, owner information, time entered and exited information, etc. (step 504).

The collected process information for the first task is then stored in one location in the repository (step 506). In this example, the collected process information may be recorded in a test flow diagram. A determination is then made as to whether there are more tasks in the software test process (step 508). If there are no more tasks in the testflow ('no' output of step 508), the process is completed (step 510), and the process terminates thereafter. However, if there are more phases in the testflow ('yes' output of step 508), the process returns to step 504 to collect the process information for the next task in the software process. Thus, the process information is collected for each task of the test process, and the collected information for each task is stored in one location. Consequently, information about each task of the software test process may be easily gathered and shared across repository boundaries.

Figure 6:
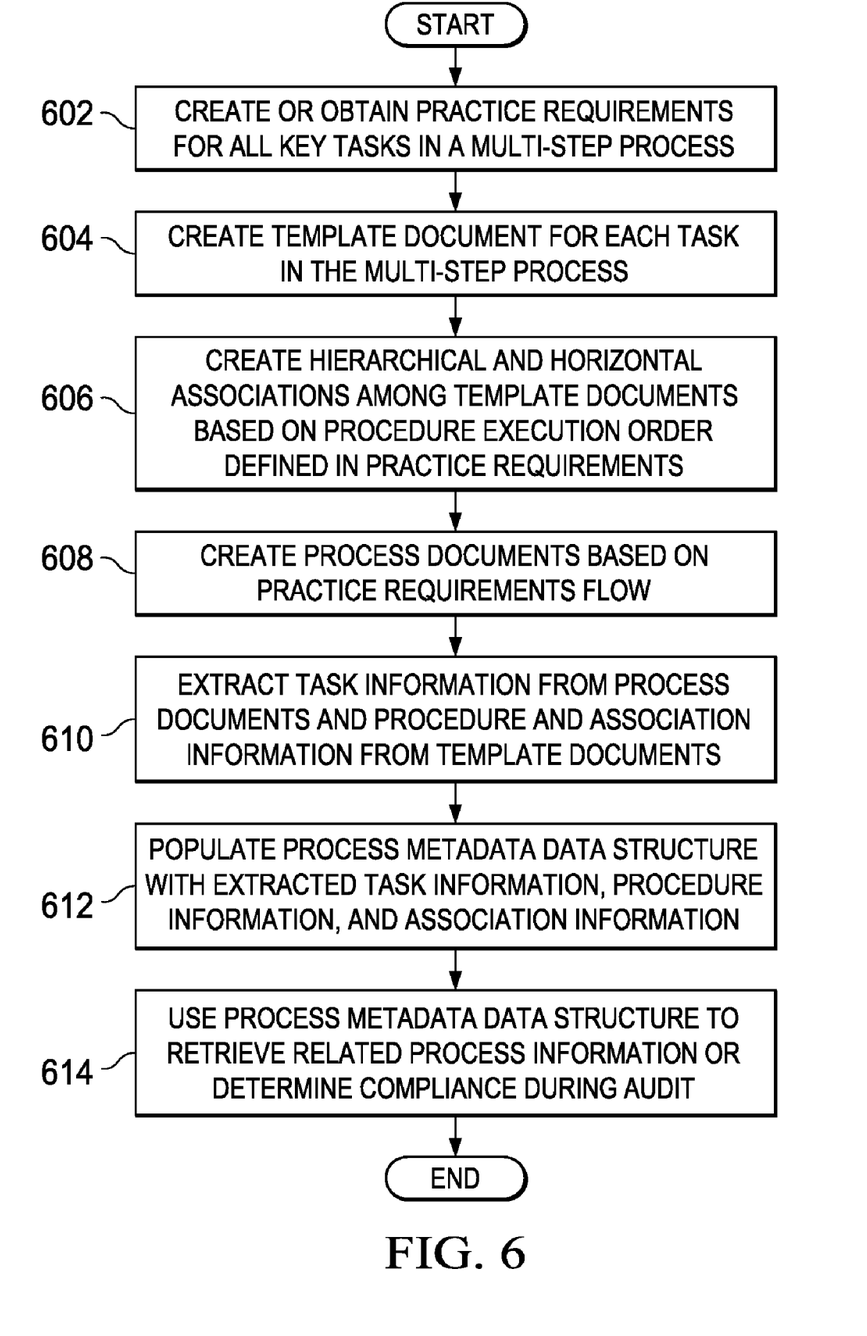
FIG. 6 is a flowchart of an exemplary process in the multilevel knowledge enablement framework for automatically capturing process information that adheres to practice requirements in a federated knowledge repository system in accordance with the illustrative embodiments.

FIG. 6 is a flowchart of an exemplary process in the multilevel knowledge enablement framework for automatically capturing process information that adheres to practice requirements in a federated knowledge repository system in accordance with the illustrative embodiments. The process described in FIG. 6 may be implemented within knowledge enablement framework 300 in FIG. 3. The process is used to determine the type of information to be captured and placed into the metadata repository in knowledge space 306 in FIG. 3.

The process begins when practice requirements are created or obtained for all key tasks in a multi-step process (step 602). Practice requirements are a set of procedures and the order of execution of the procedures that apply to all key tasks in a multi-step process in an establishment. The practice requirement information may be obtained from standards layer 304 in FIG. 3. The practice requirement information may be created based on input from a user in the establishment or organization.

After the practice requirements for all key tasks in a multi-step process have been collected, a process metadata data structure is created for each task in the multi-step process in the following manner. A template document (object) for each task in the process is created and these documents are stored in a repository in knowledge space 306 in FIG. 3 (step 604). These template documents are created in compliance with the practice requirements collected in step 602. Each template document represents the procedures that are required by the practice requirements for a specific task. Once the template documents are created, hierarchical (multilevel) and horizontal (including nested horizontal) associations, or process hierarchy, between the template documents are created based on the procedure execution order defined by the practice requirements (step 606). Thus, the associations among the template documents are defined by the practice requirements and which will define the associations among and the execution order of the tasks in the multi-step process.

The process metadata data structure comprises information about the process, such as the owner of the process, the time the process was accessed or changed, the process hierarchy (pointers to parent/child process structures), etc. An example of a basic data structure for the process metadata in accordance with the illustrative embodiments is shown below:

| Process Metadata Data Structure |
| --- |
| process_name: text |
| process_description: text |
| process_owner: text |
| process_type: text |
| process_creation: timestamp |
| process_template(s): array of process structure pointers for each template |
| process_parent: pointer to parent process structure |
| process_child(ren): array of process structure pointers |
| process_deviation: array of text |
| process_approved: Boolean |

The process_name and process_description fields specify the name and description of the process. The process_owner field specifies who owns the process, and the process_type field specifies the type of the process. The process_creation field comprises a timestamp that indicates the time that the process was accessed or changed. The process_template(s) fields comprise pointers to corresponding process documents and are used to indicate the hierarchy of the template documents. The template documents created in step 604 are the source for the pointers in the process_template(s) array. The process_parent and process_child fields comprise pointers to parent or child process structures which are used to indicate the hierarchy of the tasks in the multi-step process. The process_parent and process_child(ren) fields are initially NULL in the metadata data structure because the template documents only contain current practice requirements. The process_parent and process_child(ren) fields are updated when the actual process documents are created, as discussed below. The process_deviation field is used to specify whether a step of phase in the process may be skipped. For example, if a task in the process requires an external reference from a confidential source or a security access code, this task in the process may be skipped if the required information to perform the task is not available. The process_approved field comprises a Boolean value that indicates whether or not the corresponding process document that has been created has been approved by a project or development lead. It should be noted that the process metadata data structure described above specifies a minimum amount of information required when creating a document or object, and some applications may require additional information to be present in the process metadata data structure to create a document or object.

After the template document associations are defined, process documents may be created in accordance with the practice requirements flow (execution order) as defined in the practice requirements (step 608). Each process document created comprises a task or phase in the multi-step process and is populated with the information about the particular task or phase. The practice requirements flow or execution order dictates the order in which the process documents are created. As each process document is created, task information is extracted from the process document and procedure and association information is extracted from the corresponding template document for the task (step 610). The task information, procedure information, and association information is populated in the appropriate fields in the process metadata data structure (step 612), thereby creating a process metadata data structure that contains the information about the particular process task and that also adheres to the procedure and practice requirements flow order specified by the associations among the template documents. Populating fields in the process metadata data structure to conform to the practice requirements flow order includes updating pointers in the process_parent and process_child(ren) fields in the process metadata data structure to point to the appropriate parent or child process document of the current process document. For example, the appropriate parent process is a process document created before the new process document was created, and the appropriate child documents include the process documents created after the new process document is created. In addition, the process_approved field in the metadata data structure for a created process document may be updated to reflect whether a project or development lead has approved the created document. The order of the practice requirements flow may be altered if the process_deviation field indicates that a particular step in the process may be skipped, such as when the required information to perform the task is not available.

Once the process metadata data structure for the process has been created and the data structure fields have been populated or updated in accordance with the practice requirements, the process metadata data structure may be employed by a user to locate information about each task of the process across repository boundaries. For example, a user may traverse the process documents in the order specified by the practice requirements flow (i.e., using the pointers in the process_parent and process_child fields) to easily retrieve related process information and to locate supporting documents or objects as needed, as well as to demonstrate compliance with the practice requirements during audits (step 614).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing information about a multi-step process in disparate knowledge repositories, the computer implemented method comprising:
    collecting practice requirements for the multi-step process, wherein the practice requirements comprise procedure information for performing tasks in the multi-step process, and wherein the procedure information specifies a particular execution order of the tasks in the multi-step process; and
    creating a process metadata data structure in a metadata repository comprising process information that conforms to the practice requirements, wherein the creating step further comprises:
    creating a template document for each task in the multi-step process;
    populating the template documents with the procedure information in the practice requirements;
    creating hierarchical and horizontal associations among the template documents based on the execution order of the tasks in the procedure information;
    creating a process document for each task in the multi-step process;
    populating the process documents with information about the tasks; and
    storing the task information, procedure information, and association information for each task as metadata in the process metadata structure.

2. The computer implemented method of claim 1, wherein the tasks in the multi-step process are components comprising an information technology solution.

3. The computer implemented method of claim 1, wherein creating a process document for each task in the multi-step process includes updating pointers in a parent field in the process metadata data structure to point to a parent of the process document, and updating pointers in a child field in the process metadata data structure to point to a child of the process document based on the order of execution in the procedure information.

4. The computer implemented method of claim 3, further comprising:
    searching the metadata in the metadata repository to locate the process information about the multi-step process;
    determining from the metadata about the multi-step process that the multi-step process comprises a plurality of tasks; and
    locating, using the pointers in the metadata about the multi-step process, the process information for the plurality of tasks in accordance with the execution order specified by the practice requirements.

5. The computer implemented method of claim 4, further comprising:
    providing, to a user, the process information in the execution order specified by the practice requirements to demonstrate compliance with an audit.

6. The computer implemented method of claim 1, wherein the task information includes information about at least one of an owner of the task, time the task was entered, or time the task was exited.

7. The computer implemented method of claim 1, wherein the task is a unit test in a phase of a software test process.

8. The computer implemented method of claim 1, further comprising:
modifying the order of execution in the procedure information if a field in the process metadata data structure indicates the task in the multi-step process is an optional task.

9. A computer program product for managing information about a multi-step process in disparate knowledge repositories, the computer program product comprising:
a computer usable medium having computer usable program code tangibly embodied thereon, the computer usable program code comprising:
computer usable program code for collecting practice requirements for the multi-step process, wherein the practice requirements comprise procedure information for performing tasks in the multi-step process, and wherein the procedure information specifies a particular execution order of the tasks in the multi-step process; and
computer usable program code for creating a process metadata data structure in a metadata repository comprising process information that conforms to the practice requirements, wherein the computer usable program code for creating a process metadata data structure further comprises:
computer usable program code for creating a template document for each task in the multi-step process;
computer usable program code for populating the template documents with the procedure information in the practice requirements;
creating hierarchical and horizontal associations among the template documents based on the execution order of the tasks in the procedure information;
computer usable program code for creating a process document for each task in the multi-step process;
computer usable program code for populating the process documents with information about the tasks; and
computer usable program code for storing the task information, procedure information, and association information for each task as metadata in the process metadata structure.

10. The computer program product of claim 9, wherein the tasks in the multi-step process are components comprising an information technology solution.

11. The computer program product of claim 9, wherein the computer usable program code for creating a process document for each task in the multi-step process includes computer usable program code for updating pointers in a parent field in the process metadata data structure to point to a parent of the process document, and computer usable program code for updating pointers in a child field in the process metadata data structure to point to a child of the process document based on the order of execution in the procedure information.

12. The computer program product of claim 11, further comprising:
computer usable program code for searching the metadata in the metadata repository to locate the process information about the multi-step process;
computer usable program code for determining from the metadata about the multi-step process that the multi-step process comprises a plurality of tasks; and
computer usable program code for locating, using the pointers in the metadata about the multi-step process, the process information for the plurality of tasks in accordance with the execution order specified by the practice requirements.

13. The computer program product of claim 12, further comprising:
computer usable program code for providing, to a user, the process information in the execution order specified by the practice requirements to demonstrate compliance with an audit.

14. The computer program product of claim 9, wherein the task information includes information about at least one of an owner of the task, time the task was entered, or time the task was exited.

15. The computer program product of claim 9, wherein the task is a unit test in a phase of a software test process.

16. The computer program product of claim 9, further comprising:
computer usable program code for modifying the order of execution if a field in the process metadata data structure indicates the task in the multi-step process is an optional task.

17. A data processing system for managing information about a multi-step process in disparate knowledge repositories, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to collect practice requirements for the multi-step process, wherein the practice requirements comprise procedure information for performing tasks in the multi-step process, and wherein the procedure information specifies a particular execution order of the tasks in the multi-step process; and create a process metadata data structure in a metadata repository comprising process information that conforms to the practice requirements, wherein the computer usable code to create a process metadata data structure further comprises creating a template document for each task in the multi-step process; populating the template documents with the procedure information in the practice requirements; creating hierarchical and horizontal associations among the template documents based on the execution order of the tasks in the procedure information; creating a process document for each task in the multi-step process; populating the process documents with information about the tasks; and storing the task information, procedure information, and association information for each task as metadata in the process metadata structure.

18. The data processing system of claim 17, wherein the tasks in the multi-step process are components comprising an information technology solution.

19. The data processing system of claim 17, wherein the computer usable code to create a process document for each task in the multi-step process includes updating pointers in a parent field in the process metadata data structure to point to a parent of the process document, and updating pointers in a child field in the process metadata data structure to point to a child of the process document based on the order of execution in the procedure information.

20. The data processing system of claim 19, wherein the processing unit further executes the computer usable code to search the metadata in the metadata repository to locate the process information about the multi-step process; determine from the metadata about the multi-step process that the multi-step process comprises a plurality of tasks; and locate, using the pointers in the metadata about the multi-step process, the process information for the plurality of tasks in accordance with the execution order specified by the practice requirements.

* * * * *